Patented Sept. 26, 1950

2,523,867

UNITED STATES PATENT OFFICE 2,523,867

MONO-SALICYLATE OF 2 ETHYL HEXANDIOL

Francis J. Donnelly, Forest Hills West, N. Y.

No Drawing. Application May 20, 1947,
Serial No. 749,347

6 Claims. (Cl. 167—87)

This invention relates to a composition of matter adapted for use as a treatment for the skin and particularly the scalp.

My composition includes 2-ethylhexanediol-1,3 compounded with an agent which liberates salicylic acid slowly when in contact with the skin and exposed to moisture. This diol is preferably compounded also with an essential oil to increase the emulsifying power of the composition for perspiration or water that may be present on the skin or water present originally in the treating composition in excess of the proportion soluble in the composition.

When so compounded, the composition is adapted to remove dandruff from the scalp, to condition the scalp in general, and to control or improve seborrheic and psoriasic conditions commonly affecting particularly the human scalp.

Briefly stated, the invention comprises a composition of matter suitable for treating the skin including 2-ethylhexanediol-1,3, the monosalicylate thereof, and water. In one embodiment the invention comprises the diol, water, and an essential oil serving to increase the emulsifying power of the composition for water.

The formula for the monosalicylate of the 2-ethylhexanediol-1,3 may be written as follows:

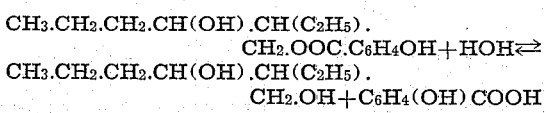

In this formula the group .OOC.C$_6$H$_4$OH is the radical of salicylic acid. This radical in effect replaces the hydroxyl group on the No. 1 carbon of the original diol.

If desired there may be used also the disalicylate in which the same radical of salicylic acid replaces the other hydroxyl group in the formula shown above. I do not know, however, of any advantage of the disalicylate over the monosalicylate and prefer to use the latter because of the greater convenience in manufacture, as will be described later.

The salicylic acid ester of the diol is a solid that is only extremely slowly volatile at ordinary temperatures. As the composition including this ester evaporates from the skin to which the composition has been applied, the ester remains behind. It is continuously in contact with moisture of the air in addition to perspiration that may at times be present on the skin. Since esters such as this one are subject to hydrolysis by water, this ester is in equilibrium with a slight but appreciable proportion of the free 2-ethylhexanediol-1,3 and salicylic acid. This hydrolysis reaction may be written as follows:

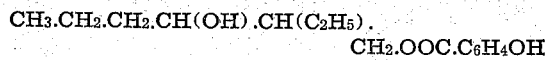
$$CH_3.CH_2.CH_2.CH(OH).CH(C_2H_5).$$
$$CH_2.OOC.C_6H_4OH + HOH \rightleftarrows$$
$$CH_3.CH_2.CH_2.CH(OH).CH(C_2H_5).$$
$$CH_2.OH + C_6H_4(OH)COOH$$

The products of the hydrolysis are, therefore, the 2-ethylhexanediol-1,3 and salicylic acid of known antibiotic properties.

The salicylic acid is not liberated in such concentration at any time as to be injurious in any way to the skin.

The essential oil used is one which is non-toxic when applied externally and is soluble in the proportion used in 2-ethylhexanediol-1,3. The oil should be completely volatile on long exposure in the form of a thin film at ordinary temperatures. Examples of essential oils that illustrate the general properties required and that may be used are bitter almond oil, oil of clove, oil of wintergreen, orange oil, and oil of peppermint.

As to the function of the essential oil, it will be recognized that water has only a limited solubility in the 2-ethylhexanediol-1,3. This limit is approximately 12 parts of water to 100 parts of the diol at room temperatures. The essential oils consist principally of alcohols, ethers, aldehydes, ketones, esters or like organic compounds, and ordinarily all of the compounds of the classes named. These oils have been found by me to have the property of increasing the emulsifiability in the composition of water in excess of that which dissolves in the diol. When water in moderate excess of the solubility proportion is agitated with the diol alone, the excess water tends to settle as the composition stands. When, however, 1 part to 5 parts of the essential oil are included for 100 parts of the whole composition, then the excess water after the agitation is in such finely divided condition that the emulsion is non-settling over a period of several hours or more.

Proportions may be varied somewhat. The salicylate ester, in general the reaction product of salicylic acid with the diol, either the mono or the disalicylate, is used suitably in proportions corresponding to 1 to 5 parts of salicylic acid. The water is used in proportion that is ordinarily not in excess of 12 parts and preferably 3 to 9 parts. The essential oil is used in the proportion of 1 to 5 parts. The proportion of the 2-ethylhexanediol-1,3 is adjusted to make 100 parts of the whole composition with the other ingredients used in the proportions selected and is in excess of the combined proportion of essential oil and water. When the antibiotic properties of salicylic acid are not required, it may be omitted.

In making the salicylic acid ester of 2-ethylhexanediol-1,3 the following method is recommended: Hexylenechlorohydrin of the formula $CH_3.CH_2.CH_2.CH(OH).CH(C_2H_5).CH_2Cl$ is mixed in equimolecular proportion with sodium salicylate. The whole is heated carefully in an oil bath at about 130° to 150° C. until the reaction is substantially complete. The reaction product is the monosalicylate ester of 2-ethylhexanediol-1,3, with sodium chloride as by-product. The ester group is in the primary position in the diol radical. If desired, there is used in the reaction mixture a solvent for the reacting ingredients that is itself inert chemically therewith. The solvent is suitably a lower monohydric aliphatic alcohol such as methanol or ethanol containing a few percent of water to increase the solubility of the sodium salicylate. With the use of a volatile alcohol or other volatile solvent, the heating at 130° to 150° C. is conducted in an autoclave.

After the reaction is complete, the whole is mixed with one of the monohydric alcohols or other solvent for the salicylate ester, in amount to dissolve the ester (unless such quantity of the alcohol or other solvent was used in the original reaction). The solution is then filtered and the salt (NaCl) remaining on the filter is discarded.

The filtrate is subjected to warming to evaporate volatile materials from it. Preferably the residue from the evaporation of the volatile material is heated under 20 mm. pressure to about 130° C. to remove any remaining free salicylic acid or other material readily volatile under these conditions.

The hexylenechlorohydrin of the formula given, serving as a raw material in the above manufacture, may be purchased as the intermediate material from which the corresponding diol (2-ethylhexanediol-1,3) is made commercially. The chlorohydrin may be provided also by the reaction of hypochlorous acid upon the corresponding hexylene, using the known technique for making chlorohydrins from olefins.

In an alternative method of making the salicylate, the salicylic acid and the diol are warmed with sulfuric acid in manner which is known to give esters of salicylic acid with alcohols of the methanol type. The product is neutralized, filtered, and a foreshot distilled from it to remove low boiling impurities. The esterification is suitably conducted in the presence of a liquid such as xylene and at the boiling point of the liquid, for removing water as formed during the esterification. The sulfuric acid is then neutralized with sodium carbonate, the resulting mixture filtered, and the filtrate heated to remove the foreshot of volatile material.

The resulting solid salicylate ester of 2-ethylhexanediol-1,3, for convenience in incorporation into my scalp and skin treating compositions, may be dissolved in, say, 10 times its weight of 2-ethylhexanediol-1,3 and the solution used in compounding the finished solutions of the present invention.

For some purposes the esterification of the salicylic acid with the diol in advance of incorporation into the finished composition may be omitted. In this case the salicylic acid, in the proportion of 1 to 5 parts for 100 parts of the whole composition, is incorporated in unreacted form. In this instance there is a slow and incomplete esterification of the salicylic acid with the excess of the diol.

The invention will be further illustrated by description in connection with the following specific examples of my composition.

Example 1

A composition is made of the following formula: reaction product of 2 parts of salicylic acid U. S. P. with an excess of 2-ethylhexanediol-1,3, 9 parts of water, 2 parts of essential oil of the variety known as orange oil, and 2-ethylhexanediol, including the excess referred to above, in amount to make 100 parts total weight of the composition. Any suitable non-toxic perfuming agent may be included.

Example 2

In place of the orange oil of Example 1, there is used the oil of clove, wintergreen, or peppermint.

Example 3

In the composition of Example 1, there are introduced 1 or more of the following ingredients in the proportion of 0.5 part to 5 parts for 100 parts of the total composition: methyl salicylate, potassium carbonate or bicarbonate, colloidal sulfur, tar or crude oil, sodium borosalicylate, a water soluble borosalicylate, and resorcinol monoacetate.

Example 4

In the composition of Example 1 there is included 1 to 5 parts of glycerine or 1 to 5 parts of lanolin or both. Suitably the glycerine or lanolin or mixture thereof is used in amount approximately equal to the proportion of the salicylic acid represented in the composition, to provide a plasticizing effect for the salicylate ester of the 2-ethylhexanediol-1,3. The glycerine serves also as an humectant which makes certain that water, necessary to the hydrolysis of the monosalicylate, will be continuously in contact with the salicylate on the scalp.

To the extent that the glycerine reacts with the salicylic acid or the diol salicylate, it forms a glycerine salicylate.

Example 5

The formula for this example is one which is used when no antibiotic action is required in addition to that caused by the diol. The formula is 2-ethylhexanediol-1,3, 89 parts; water 9 parts; and any one of the essential oils described, 2 parts.

It will be understood that it is intended to include all changes and modifications of the examples of the invention herein chosen for the purpose of illustration which do not constitute departures from the spirit and scope of the invention.

What I claim is:

1. As a new compound, the primary monoester of salicylic acid with 2-ethylhexanediol-1,3.

2. A scalp treating composition comprising 2-ethylhexanediol-1,3, the monosalicylate of the 2-ethylhexanediol-1,3, and water, the several ingredients being dissolved in each other to form a solution.

3. A composition as described in claim 2, the water being present in proportion in excess of that soluble in the composition and the composition including an essential oil in the proportion of 1 to 5 parts for 100 parts of the entire composition, the essential oil serving to increase the emulsifying property of the composition for water.

4. A scalp treating composition comprising 2-ethylhexanediol-1,3, water, and an essential oil, the 2-ethylhexanediol-1,3 being present in proportion in excess of the combined weight of the water and said oil.

5. A scalp treating composition comprising the product of mixing 1 to 5 parts by weight of salicylic acid with an excess of 2-ethylhexanediol-1,3, 3 to 9 parts of water, and 1 to 5 parts of essential oil, the 2-ethylhexanediol-1,3 being used in amount to make 100 parts total weight.

6. A composition of matter as described in claim 4 including, for 100 parts of the said composition, 1 to 5 parts of glycerine.

FRANCIS J. DONNELLY.

REFERENCES CITED

The following references are of record in the file of this patent:

UNITED STATES PATENTS

| Number | Name | Date |
|---|---|---|
| 794,982 | Hofmann | July 18, 1905 |
| 1,404,673 | Wershow | Jan. 24, 1922 |
| 1,911,551 | Cleveland | May 30, 1933 |
| 1,951,737 | Nitardy | Mar. 20, 1934 |
| 2,022,185 | Bruson | Nov. 26, 1935 |
| 2,056,208 | Putt | Oct. 6, 1936 |
| 2,069,175 | Preiswerk | Jan. 26, 1937 |
| 2,070,240 | Ruben | Feb. 9, 1937 |
| 2,081,117 | Hall | May 18, 1937 |
| 2,112,319 | Wickert | Mar. 29, 1938 |
| 2,113,374 | Hall | Apr. 5, 1938 |
| 2,396,013 | Jones | Mar. 5, 1946 |

OTHER REFERENCES

Goodman: Cosmetic Dermatology, McGraw-Hill Book Co., 1936, pages 232, 233, 243, 312–316.

J. A. M. A., March 26, 1949, pages 840–844.